United States Patent [19]
Morozumi

[11] 3,735,345
[45] May 22, 1973

[54] AUTOMATIC STOP LAMP DEVICE OF A CAR

[76] Inventor: Yoshimi Morozumi, 2319, Obiori, Sakae-mura, Minamikanbara-gun, Niigata-ken, Japan

[22] Filed: Feb. 24, 1971

[21] Appl. No.: 118,375

[30] Foreign Application Priority Data

Mar. 3, 1970   Japan..................................45/21073

[52] U.S. Cl. ....................340/62, 180/106, 180/110, 340/71
[51] Int. Cl...............................................B60g 1/50
[58] Field of Search......................340/62, 71, 72, 94; 180/110, 106

[56] References Cited

UNITED STATES PATENTS

| | | | |
|---|---|---|---|
| 3,444,514 | 5/1969 | Yang | 340/71 |
| 3,310,774 | 3/1967 | Marian | 340/62 |
| 3,476,204 | 11/1969 | Westby et al. | 180/110 |

Primary Examiner—John W. Caldwell
Assistant Examiner—Glen R. Swann, III
Attorney—Lester Horwitz

[57] ABSTRACT

A stop lamp device of a car for preventing rear-end collisions by turning on a stop lamp automatically when the speedometer indicates 0, which is done through contacts in the speedometer with electric circuitry.

1 Claim, 4 Drawing Figures

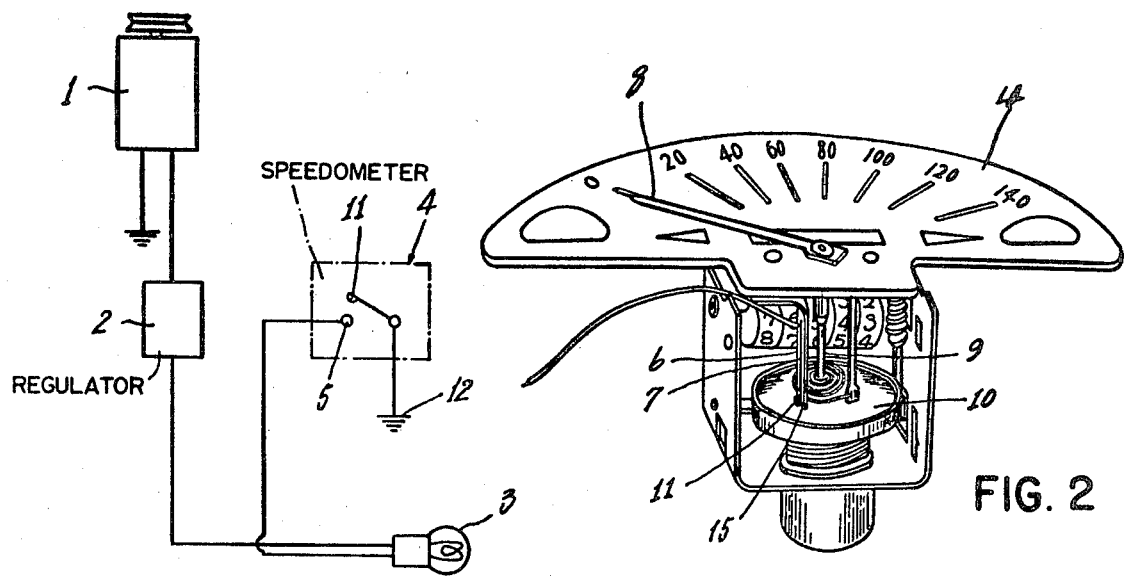
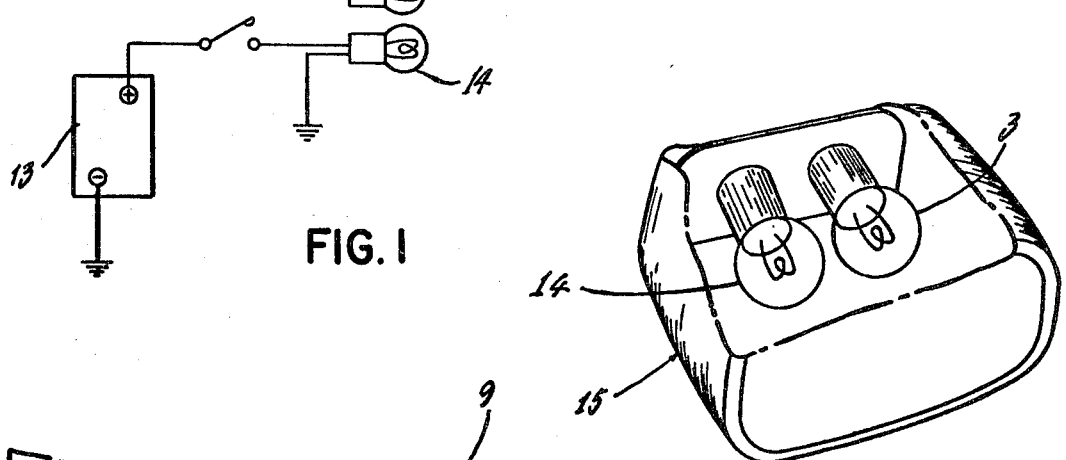
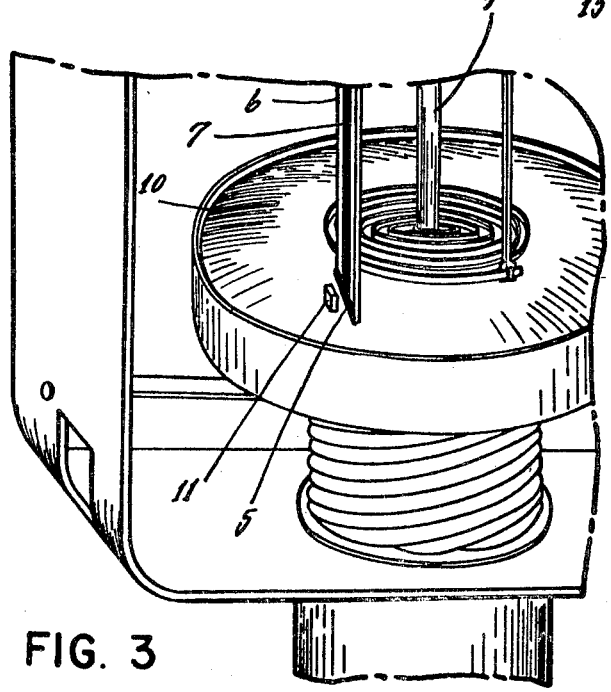
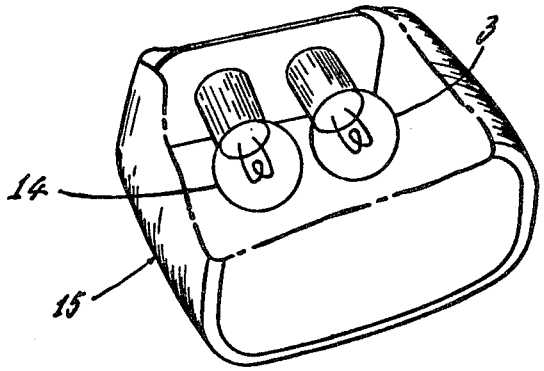

AUTOMATIC STOP LAMP DEVICE OF A CAR

This invention relates to an automatic stop lamp device for a car for preventing rear-end collisions. Hitherto, when a driver works a brake pedal to stop the car, there is lit a brake lamp at the same time which indicates to a following car the stopping of the front car. However, when the car comes to a full stop, it often occurs that the driver releases his foot from the brake pedal and prepares for a start. Then the brake lamp is put out due to this action and there exists no sign to the following car. Therefore, it is not easy for the following car to recognize that the car in front is at a stop and there often occurs a rear-end collision accident due to the mistaken impression that the front car is on the move.

The purpose of the present invention is a device for avoiding the cause of such a miserable car accident. More particularly, even when the car is at a stop, the stop lamp of this invention is maintained on as long as the engine is in operation and enables a following car to easily recognize that the car in front is at a stop.

These and other objects and advantages of the invention will be apparent from the following detailed description in connection with the accompanying drawings in which:

FIG. 1 is a circuit diagram of the invention;

FIG. 2 is a perspective view of the main portion of the device embodying the invention;

FIG. 3 is an enlarged perspective view of the same main portion; and

FIG. 4 is a perspective view of a socket partially broken away.

Referring to FIG. 1 and 2 of the drawings, there is shown a stop lamp device comprising a stop lamp 3 of which one of the terminals is connected to a generator 1 through a regulator 2 and the other to a contact point 5 of a speed meter 4.

When the engine of a car is in operation, the generator 1 starts to rotate and generates electricity. An electric current which is generated thereby is introduced to the regulator 2 and then introduced to the stop lamp 3 which is provided at a rear. And further, the current is introduced to the contact point 5 of the speedometer 4. The contact point 5 is provided by wire printed 7 on a surface of an insulator 6 which is arranged in the speedometer 4.

When the car is stopped, a pointer 8 of the speedometer 4 indicates 0. At the same time a projection 11 which is provided at a portion of a rotary disc 10 being fixed to a lower end of a shaft 9 of the ponter 8 comes into contact with the contact point 5 and is earthed 12. Therefore, there is lighted the stop lamp 3. The stop lamp 3 is contained in a same socket 15 in which there is contained a brake lamp 14. The brake lamp 14 is connected directly to a battery 13 in a conventional manner.

In a feature of the invention, when the brake pedal is depressed for stopping the car, the brake lamp 14 is lit. When the car comes to a full stop and the pointer 8 of the speedometer 4 indicates 0, the stop lamp 3 is lit. The brake lamp 14 is extinguished when his driver releases the foot from the brake pedal to make the other action to prepare for the next start. However, as the stop lamp 3 is kept lit even when the brake lamp 14 is put out, the car which follows is able to recognize easily that the car in front is at a stop.

On the other hand, when the car begins to move, the pointer 8 of the speedometer 4 moves away from 0 and the projection 11 of the rotary disc 10 goes away from the contact point 5. Then the stop lamp 5 is extinguished.

The device operates whether or not speedometer 4 is out of order. The device of the present invention is manufactured relatively simply and at a low cost.

As a power supply source a battery can be used, as well as, a generator by minor changes in circuitry.

The main characteristic of this invention is to turn on a stop lamp automatically when the speedometer indicates 0, which is done through contacts by electric circuitry.

Thus this invention is practical as a device for preventing rear-end collisions.

I claim:

1. A stop lamp device for a vehicle provided with electrical circuit means in a speedometer in said vehicle which includes a projection provided at a suitable position on a rotary disc to which a lower end of a pointer shaft is fixed, an insulated stopper suspended from above the rotary disc at a position where said projection comes into contact therewith when the pointer occupies a position corresponding to zero speed; said electrical circuit means including a contact point provided at the lower end of said insulated stopper to be contacted by said projection; said stopper being provided on its surface with printed wire which is connected to a stop lamp arranged in parallel with a usual brake lamp; said stop lamp being illuminated independently of the brake lamp when the pointer of the speedometer occupies a position corresponding to zero speed and said projection on the rotary disc of the speedometer comes into contact with said contact point on said insulated stopper provided with the printed wire.

* * * * *